INVENTORS
NESTOR P. SIIRO

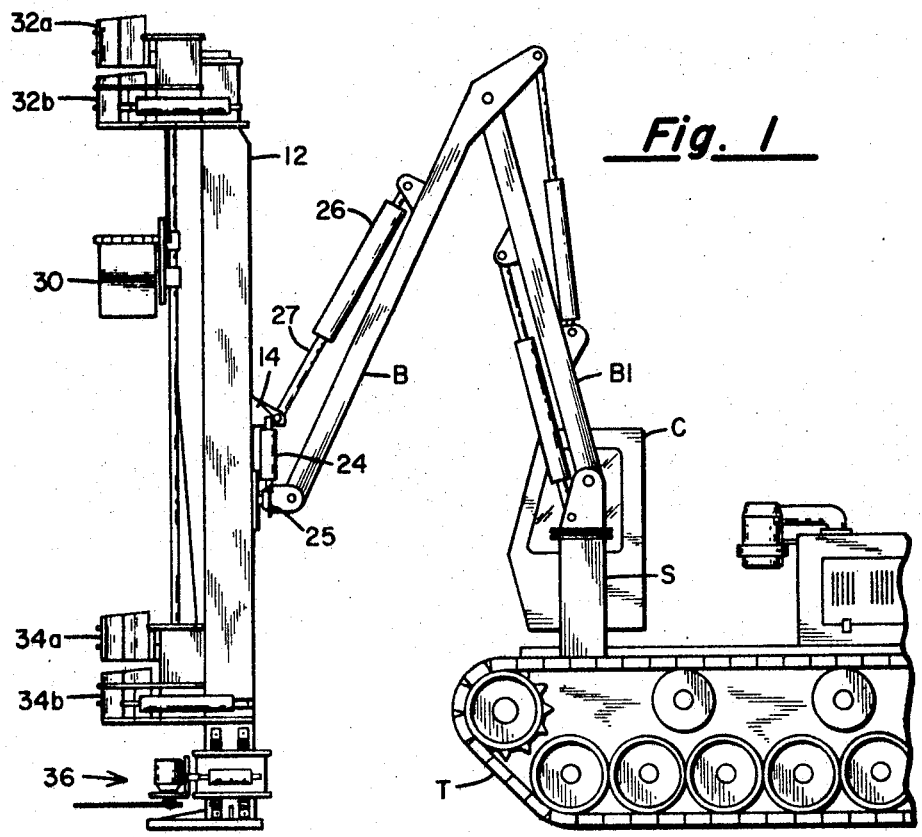
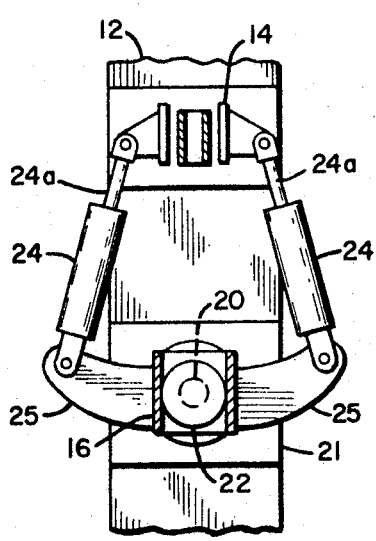
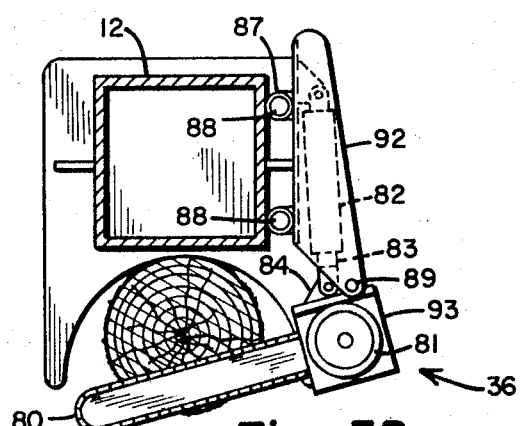

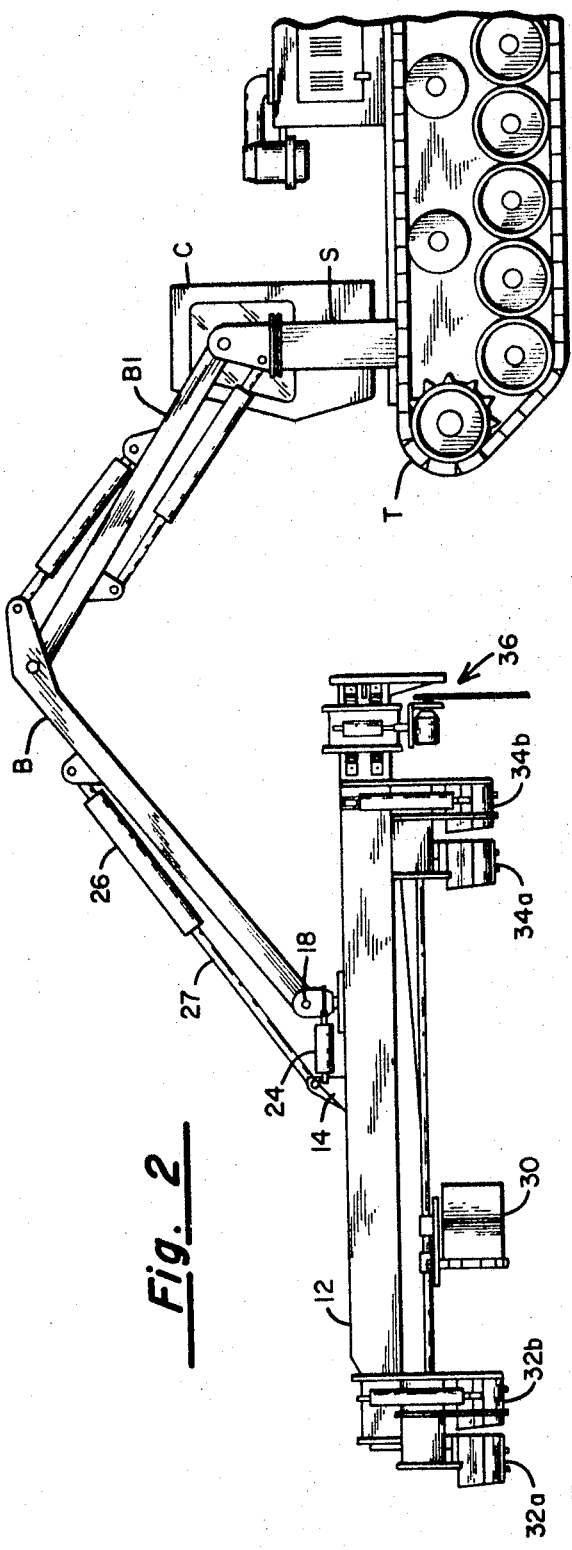
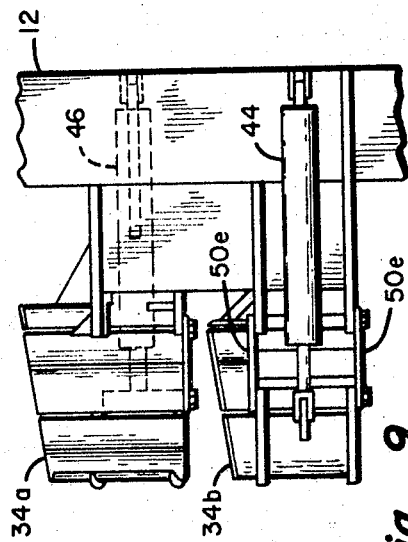
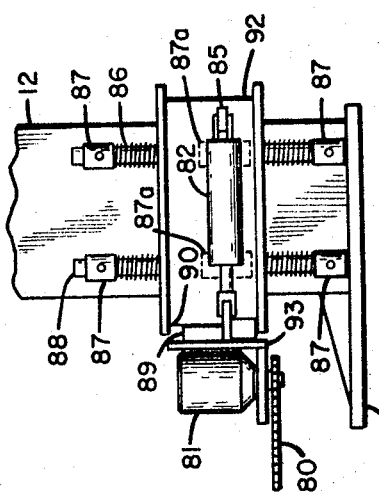

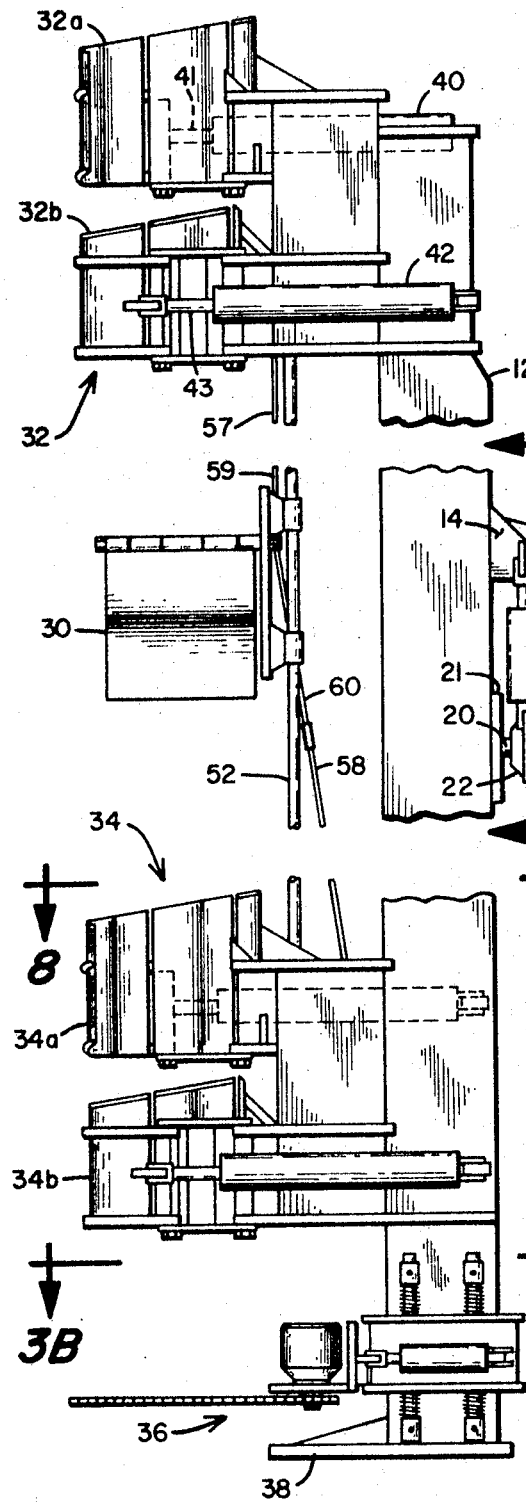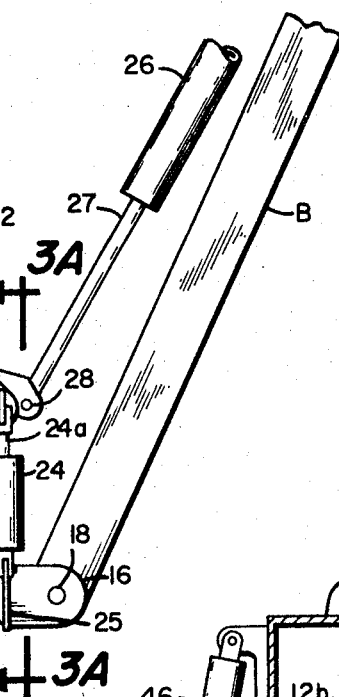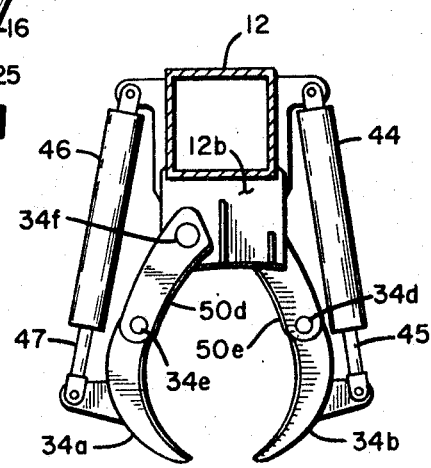
Fig. 3
Fig. 8
INVENTORS
NESTOR P. SIIRO
BY Stryker and Jacobson
ATTORNEYS Aug. 19, 1969 N. P. SIIRO 3,461,928
TREE HARVESTER Filed Jan. 17, 1967 5 Sheets-Sheet 4

BY *Stryker and Jacobson*
ATTORNEYS

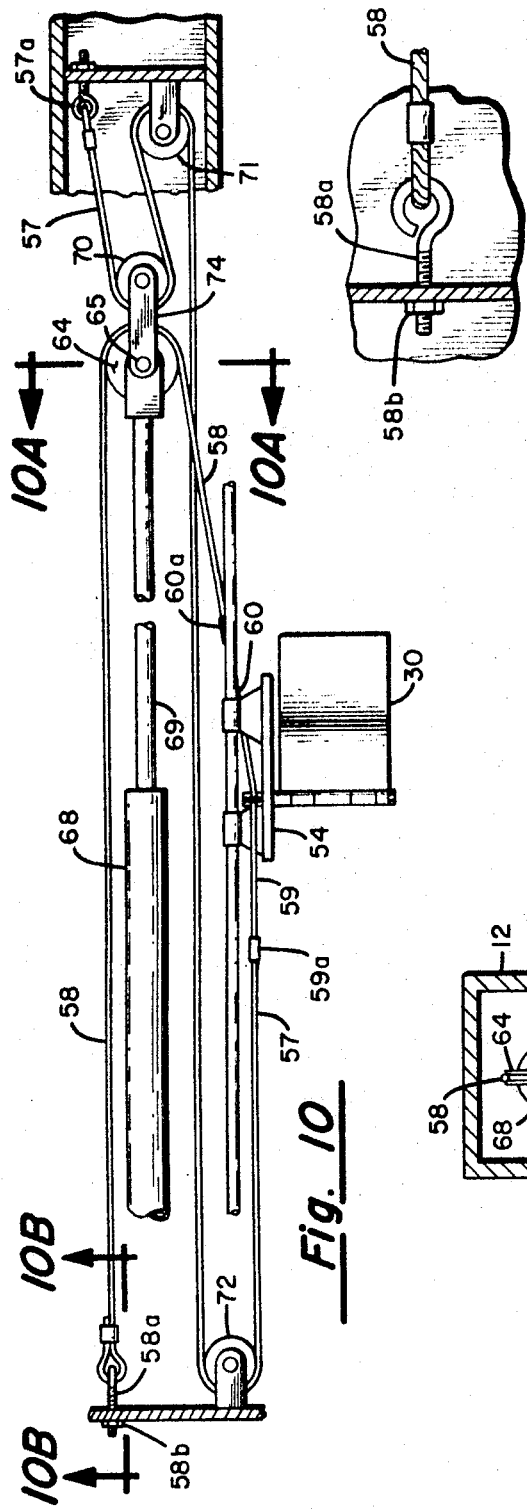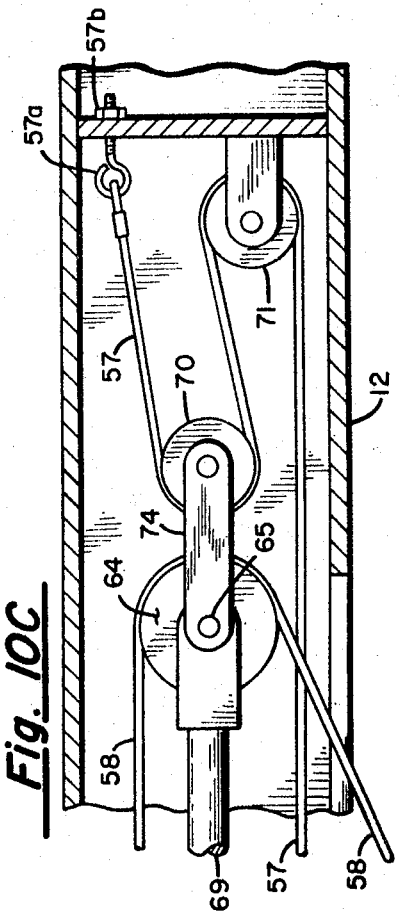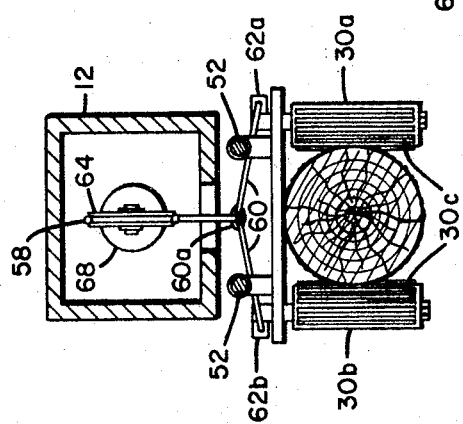

United States Patent Office 3,461,928
Patented Aug. 19, 1969

3,461,928
TREE HARVESTER
Nestor Pete Siiro, Angora, Minn., assignor to Omark Industries, Inc., Portland, Oreg., a corporation of Oregon
Filed Jan. 17, 1967, Ser. No. 609,857
Int. Cl. B27b *1/00, 17/00*
U.S. Cl. 144—3          12 Claims

ABSTRACT OF THE DISCLOSURE

A mast, having grasping and delimbing grapples fixed at each end, a movable puller in between and a saw at one end outside the bottom grapple, is attached to an articulated boom so that it can be swung over a wide area. Thee mast can be tilted if required for harvesting bent trees. After a tree is felled and while it is held by the grapples, the tree puller moves between the grapples to pull the tree trunk through the grapples for delimbing and for measuring off sections of tree trunk to be severed by the saw. The saw assembly is spring mounted to the mast to minimize damage to the saw.

---

This invention relates to improvements in tree harvesters which are adapted to cut standing trees, delimb them, lower them to a horizontal position, cut them to predetermined lengths of a convenient size for transportation and either stack the delimbed trees or stack the sections on a suitable vehicle for transfer to a mill.

An object of my invention is to provide a tree harvester of the class described which includes a boom and boom mounting which is operative to harvest trees located anywhere within a large area defined by the area encompassed within an angle of 360 degrees about an approximately vertical axis of the boom support.

A further object is to provide a tree harvester adapted for use in areas where trees are widely spaced or scattered and where the harvester is used in a stationary position adjacent to a landing and has a boom adapted to lay a felled tree into a horizontal position and process the tree by cutting it to predetermined lengths while delimbing each section as required.

Another object is to provide tree harvesting mechanism which is adapted to be mounted on or detached from a tractor and having a boom adapted to carry a standard pulp bucket for use as a forwarding and pulp loading device.

A further and particular object is to provide a tree harvester having a mast and a tree puller which is movable along the mast on a flexible track, thereby allowing the tree puller to follow the contour of irregularly bent or curved tree trunks without jamming.

A further object and feature of the invention is the provision of stationary delimbing grapples mounted respectively near opposite ends of the mast to facilitate the handling of the tree trunk when removing limbs along the entire length of a tree trunk.

A further particular object and feature resides in the provision of independently movable delimber and grapple jaws spaced along a mast to make it feasible to locate portions of the tree trunk between the delimber jaws and then to close the jaws around the trunk and pull the tree with a separate puller longitudinally through the jaws to remove the limbs.

A still further particular object is to provide a tree harvester with a saw that is floating on the mast so that it will not bind or be subjected to undue strains and stresses during felling and cutting.

This invention also includes certain other novel features of construction which will be more fully pointed out in the following specification and claims.

Figure 4:
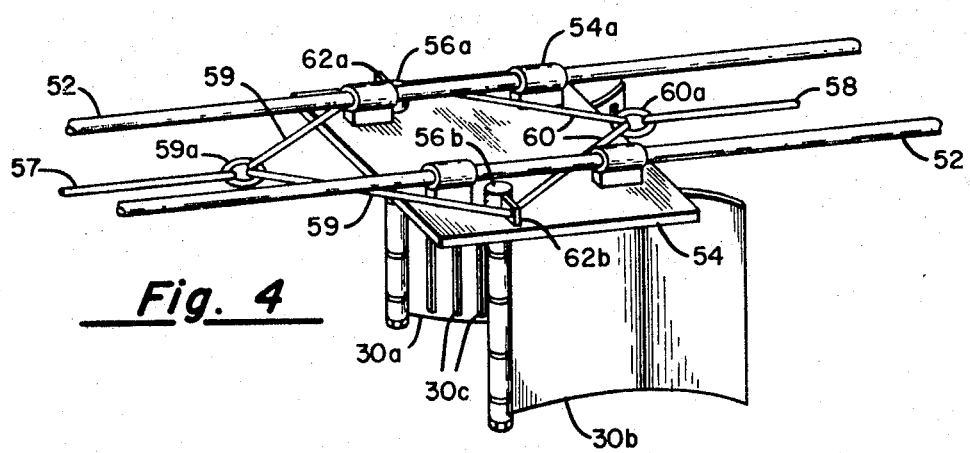
Figure 6:
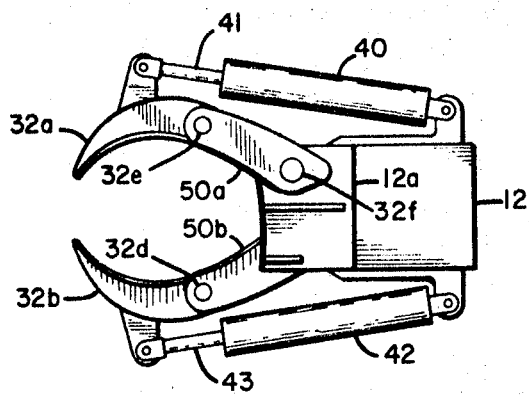
Figure 7:
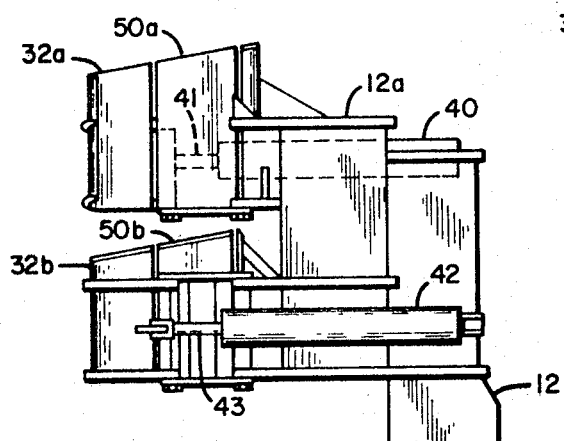
Figure 5:
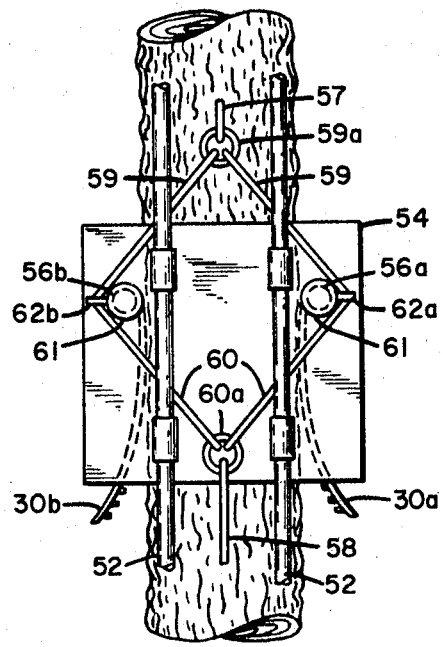

Referring to the drawings:
FIGURE 1 is a side elevational view of a preferred form of the invention showing the mast in substantially vertical position;
FIG. 2 is a side elevational view showing the mast extended forward in a substantially horizontal position;
FIG. 3 is a fragmentary, side elevational view on a somewhat enlarged scale showing the mast in substantially vertical position;
FIG. 3A is a section as viewed approximately along the line 3A—3A of FIG. 3;
FIG. 3B is a section as viewed along the line 3B—3B of FIG. 3 showing details of the saw and actuating means for cutting tree trunks into pieces;
FIG. 3C is a somewhat enlarged side view of one end of the mast showing some of the details of the saw and its driving means;
FIG. 4 is an isometric view showing some of the details of the tree puller mechanism and its flexible guide and actuating cables;
FIG. 5 is an elevational view of the tree puller mechanism and associated cables as seen from the mast side;
FIG. 6 is a view showing some of the details of the top delimbing grapple as viewed from the top end of the mast;
FIG. 7 is a side elevational view of the top delimbing grapple;
FIG. 8 is a view of the bottom delimbing grapple as viewed along line 8—8 of FIG. 3;
FIG. 9 is a side elevational view of the bottom delimbing grapple;
FIG. 10 is a view in somewhat schematic form showing the tree puller, cables and hydraulic driving means and means for actuating them with portions of the mast omitted for clarity;
FIG. 10A is a section as viewed along line 10A—10A of FIG. 10 with the mast included;
FIG. 10B is a somewhat enlarged fragmentary longitudinal section through the mast showing some greater detail of the tension adjusting means for one of the cables; and
FIG. 10C is a somewhat enlarged fragmentary longitudinal section through the upper portion of the mast showing particularly somewhat greater detail of the cables and sheaves therein.

As shown in the general views, FIGS. 1 and 2, the tree harvester of this invention has a mast 12 which is pivotally supported on a stick boom B which is attached to a main boom B1. This articulated boom construction is of common type and is mounted on a support S having a vertical axis about which the boom may be rotated in the usual fashion. Support S is shown mounted on a tractor generally designated T. Power for actuating the several boom members and tree delimbing mechanisms is provided by suitably located hydraulic cylinders or motors for operating the mechanisms. Controls for the hydraulic fluid are located in a cab C mounted on the tractor T. The boom operating mechanism includes means for changing the angle of the main boom member B1 relative to its support S and for changing the angle of stick boom B relative to B1. This arrangement permits the boom operator to swing the mast through a wide area of standing trees to harvest a large number of trees without having to continually manipulate the transport tractor T. Furthermore, the operator is able to bypass individual trees, if he so desires, to pick out the more desirable trees to harvest.

As best shown in FIGS. 3 and 3A, the connections between the stick boom B and mast 12 include a bracket 14 projecting from and rigidly connected to the mast and a bracket 16 supporting a pivot shaft 18 for the boom B. A shaft 20 extends at right angles to the shaft 18 and is rigidly connected at one end to a plate 21 fixed to the mast 12. A bearing hub 22 embraces the shaft 20 to permit rotation of the mast for sidewise tilting of the mast from its vertical position. Hydraulic cylinders 24 are pivotally connected at their upper ends to the bracket 14 by piston rods 24a, at their lower ends are attached to arms 25 projecting laterally from the bracket 16 whereby the mast may be rotated about shaft 20 and tilted as desired. By the use of this sidewise adjustment or tilting of the mast, it can be more closely aligned with a tree which leans to one side or the other when the mast is moved out to harvest the tree. As further shown in FIGS. 1, 2 and 3, the boom is also connected to the mast 12 by hydraulic cylinder 26 which is connected at one end to a bracket on boom section B and by piston rod 27 pivotally attached to bracket 14 at 28. This provides the means for forwardly pivoting the mast from the vertical to a horizontal position about shaft 18 such as shown in comparing FIGS. 1 and 2. And, of course, this arrangement provides the means for further tilting the mast, if necessary, to grasp inclined trees.

Mechanisms for grasping and harvesting a tree are mounted on the mast 12. These include a tree puller indicated generally at 30, a top delimbing grapple indicated at 32, a bottom delimbing grapple indicated at 34, a saw 36 for cutting through the tree trunk and a foot plate 38 at the base of the mast to protect the saw against contact with the ground when a tree is moved from substantially vertical to substantially horizontal position in the grasp of the tree puller jaws. Rigid lateral extensions of the mast 12, indicated at 12a and 12b, help to support the respective upper and lower delimbing grapples.

As shown in detail in FIGS. 6 and 7, the top grapple 32 has delimbing jaws 32a and 32b adapted to close on opposite peripheries of a tree trunk for holding and delimbing purposes. Jaw 32a is opened and closed by hydraulic cylinder 40 and piston rod 41 pivotally connected between jaw 32a and the mast 12. The jaw 32b is similarly operated by hydraulic cylinder 42 and its associated piston rod 43 connected to mast 12. The jaws 32a and 32b are respectively pivotally attached at 32e and 32d to link plates 50a and 50b which are each pivotally attached to the mast extension 12a by a pin 32f. Cylinders 40 and 42 are both fed by a single common hydraulic input line (not shown) so that both jaws 32a and 32b are operated to swing open and closed at the same time. However, since each jaw is independently movable, both jaws can be brought to bear down on the tree trunk. In other words the arrangement is such that when the jaws are swung closed if one jaw should strike the tree trunk first it will not prevent the other jaw from closing until it strikes the trunk.

The lower or bottom delimbing grapple shown in FIGS. 8 and 9 is similarly constructed and operated. The jaws 34a and 34b of the bottom grapple are respectively operated by hydraulic cylinder 46 with piston 47 and cylinder 44 with piston 45 so that each jaw can move independently. Jaws 34a and b are respectively pivotally attached to link plates 50d and e by pins 34e and d. The link plates are in turn pivotally attached to mast 12 by pins 34f. The cylinders 44 and 46 are fed by a common hydraulic input line.

The independent movement of each of the jaws permits tree trunks of somewhat irregular shape to be centered better between each pair of delimbing jaws. Thus when the jaws are closed about the tree trunk they are so located as to more evenly sever the limbs or branches of the tree from the trunk. With the jaws of each delimbing grapple located and arranged to strip the limbs and branches off approximately 50% of the trunk surface and each jaw being attached separately to the mast, the load on the delimbing grapples during delimbing is evenly distributed and not concentrated on one jaw nor on one linkage to the mast. As will later become apparent, the lower grapple in effect only delimbs one section of the tree trunk while the upper grapple 32 delimbs the remainder.

Ordinarily the upper and lower grapples are closed and opened at the same time so a single hydraulic line (not shown) feeds both sets of cylinders from the controls in the cab. In some cases it is desirable to have a manual override so that the upper and lower grapples, 32 and 34, can be operated independently if need be.

Located on the mast between the grapples 32 and 34 is the tree puller 30. Details of the tree puller and its operating mechanisms are shown most clearly in FIGS. 4, 5, 10, 10A and 10B and 10C. The tree puller carriage plate 54 is moved along the mast 12 between the grapples 32 and 34 by slide bearings 54a on a pair of strong steel guide cables 52 which are fixed at their ends to mast 12 in any convenient fashion. A pair of inward facing arcuate jaw plates 30a and 30b, extend out from one side of the carriage plate 54 and each is pivotally attached at one end to the carriage plate 54 by rods 56a and 56b respectively. Attached to the end of the rods on the opposite side of the carriage plate 54 are tabs or lever arms 62a and 62b. Force or pressure applied to the tabs 62a and 62b cause the jaw plates 30a and 30b to swing open or closed as desired. The jaw plates are adapted to grip a tree trunk between their convex faces. The gripping faces of the jaws are formed with a multiplicity of generally parallel ridges 30c which are constructed to penetrate the bark of the tree and provide a firm grip on the tree trunk.

Power for opening and closing the jaw plates 30a and 30b and for pulling the tree puller assembly along the mast on the guide cables 52 is transmitted by main cables 57 and 58 and pairs of branch cables 59 and 60. Cable 57 branches off into cable pair 59 at 59a and cable 58 branches off as cable pair 60 at 60a. The other ends of the cable pair attach to one another at the tabs 62a and 62b. In this manner the force is applied for opening and closing the jaw plates 30a and b. When the cable 58 is drawn to the right (FIG. 4) or downward (FIG. 5), which corresponds in direction toward bottom grapple 34, the jaw plates 30a and 30b are swung closed on a tree trunk that may be positioned between the jaw plates. At the same time the carriage plate 54 is pulled in the direction of the cable 58. To release or open the jaw plates, cable 58 is released and cable 57 is drawn to the left or upward and the carriage plate moves in the corresponding direction.

FIG. 10 shows in detail the arrangement of the cables and their hydraulic drive means for operating the tree puller for cutting a true trunk into sections and for delimbing. From the junction 60a, the cable 58 extends upward and rightward to and over sheave 64 which is movable longitudinally within the hollow mast 12. The sheave rotates about its axial shaft 65 and shaft 65 is mounted to the end of piston rod 69 which projects out from hydraulic cylinder 68. Cylinder 68 is fixedly attached to the hollow mast 12 in any convenient fashion (not shown). Cable 58 after passing over the sheave 64 extends along and within the upper side of the mast and is anchored at the upper or left end of mast 12 by suitable means, such as a threaded eyebolt 58a for maintaining tension in the cable as shown a little more clearly in FIG. 10B. A nut 58b is adjustable along the bolt to provide the necessary tension adjustment. When hydraulic pressure is applied to cylinder 68 to actuate the piston rod 69 to move sheave 64 to the right (FIGS. 10 and 10C) the tree pulled is moved in the same direction. At the same time the pull on cable 58 acts on the tabs 62a and b, via branches 60 (FIG. 4), to swing jaw plates 30a and b together so that any tree trunk located between the jaw plates will be pulled to the right along with the tree puller.

As further shown in FIG. 10C the cable 57 is anchored at one end to an end closure for the mast 12 by eyebolt 57a having a tension adjusting nut 57b, similar to bolt 58a and nut 58b for cable 58. From the bolt 57a cable 57 winds part way over a sheave 70 within the hollow mast, and then back over a sheave 71 near the right or lower end of the mast. From sheave 71 cable 57 extends leftward and over a sheave 72 mounted within the mast near its upper or left end and then extends to the junction 59a with the branch cables 59. A pair of link bars 74 connect the shaft of sheave 70 to the shaft 65 of sheave 64 so that when the piston rod 69 moves back and forth longitudinally of the mast to move sheave 64, sheave 70 is moved correspondingly which in turn causes cable 57 to move. Retraction of piston rod 69 into cylinder 68 pulls sheaves 64 and 70 leftward so that the reach of cable 57 between sheaves 71 and 72 moves rightward and the lower reach is pulled leftward to move the tree puller to the left. At the same time the force on the branch cables 59 acts on the tabs 62a and b to swing the jaw plates 30a and b open.

Means for sawing tree trunks into sections of predetermined length are indicated generally by the numeral 36 in FIGS. 3 and 3B. The saw may be of conventional type and is preferably a chain saw having a blade indicated at 80 in FIG. 3B and adapted to extend at one side of a tree supported by the mast 12 and held between the delimbing grapple jaws. As shown, the saw 80 is operated by a rotary motor 81, preferably of the hydraulic type. The motor 81 is mounted on a right angle plate 93 which is pivotally mounted at 89 to a carriage plate 92. During the sawing operation the plate 93 is driven by hydraulic cylinder 82 and piston rod 83 to move the saw in a plane extending crosswise of the mast to cut through the tree trunk where desired and to swing back out of the way after the cut. Piston rod 83 is pivotally connected to an arm 84 projecting from the motor mounting plate 93 and the other end of the cylinder 82 is attached by bracket 85 to carriage plate 92. The latter is attached to the mast so that it can move or float lengthwise of the mast but is constrained from tilting. Two pair of hollow tubular support members 87 are fixedly attached to the mast. On the back of the carriage plate 92 another pair of hollow tubes 87a are fixedly attached. The latter are somewhat longer than tubes 87 but are substantially the same inner and outer diameters and are located between the upper and lower tube members 87 of each of the latter pair. An elongated solid metal guide rod passes down through each pair of tubular members 87 and its associated member 87a. The carriage plate 92 is free to move along the guide rods 88. Between the bottom and top tubular members 87 and their corresponding members 87 are helical compression springs 86 surrounding the rods 88. In the event a tree trunk or branch or the like should strike any part of the saw assembly 36, the floating attachment to the mast 12 will prevent the mechanism from bending, breaking or being bound up. This is also the case in the event the tree trunk shifts while it is being cut.

Operation

The tree harvester of this invention may used in various manners. In order to utilize the various features of the invention to best advantage for standing trees, the tractor or other vehicle carrying the mast 12 is moved into a position at which it is possible to harvest a number of trees without continually manipulating the vehicle. The operator in the cab C operates various controls, no shown, to manipulate the boom sections B and B1 to swing the mast 12 out to the first tree to be harvested. Ordinarily, the mast is moved toward the tree in substantially vertical position such as illustrated in FIGS. 1 and 3. If the tree is leaning one way or another, the sidewise angle of the mast is adjusted by operating cylinders 24 to tilt the mast about the substantially horizontally extending pivot shaft 20 to the desired angle. The mast 12 is positioned until the tree trunk is located within the grasping area of the jaw plates of the tree puller 30 and the jaws of the grapples 32 and 34. Ordinarily the tree puller 30 is initially located at the top of the mast (FIGS. 1 and 3) or leftmost (FIG. 10). The jaws of the upper and lower grapples, 32 and 34, can then be closed by operating the corresponding hydraulic cylinders.

With the tree trunk constrained between the grapple jaws, the saw 36 is then operated to cut through the tree trunk near its base and just above the foot plate 38 projecting from the lower end of the upstanding mast. When the tree trunk is severed through, the cut tree is swung toward a horizontal position such as illustrated in FIG. 2, by operating hydraulic cylinder 26 and/or cylinder 24. Boom parts B and B1 may also have to be adjusted.

The tree trunk is then in position for cutting into pieces and delimbing. Cylinder 68 (FIGS. 10 and 10A) is operated to move the piston rod 69 to the right thereby swinging the jaw plates 30a and b into tree-gripping position and moving the tree puller 30 and the tree to the right. As the section of the tree which was initially located between grapple jaws 32 and 34 passes through grapple 34, the cutting edges of the jaws of the latter strips the limbs and branches from the tree trunk. At the same time, a similar length of tree is delimbed when passing through the jaws of the upper grapple 32. After this first section has gone through the lower grapple, thereafter virtually all delimbing is by the upper grapple. The tree trunk is advanced in this direction for the full length of stroke of piston 69. The length of the stroke corresponds to the length of the sections into which the tree trunk is to be cut so that at the end of the stroke the cutter 36 is again operated to sever off a section of the delimbed trunk.

After sawing off the section, piston 68 is operated to reverse the direction of movement of cables 57 and 58 to the left. This opens the jaw plates 30a and 30b and the tree puller is moved to the left a distance equal to the withdrawal stroke of the piston. When piston 69 is again advanced rightward, the puller jaws are again closed on the tree trunk, the other section of the tree is advanced through the grapples and the saw 36 is again operated to cut off another section of the tree trunk. This succession of operation is repeated until the entire usable portion of the tree trunk has been delimbed and cut into sections. As each section is cut it may be either loaded on a truck, trailer or other vehicle or merely rolled to one side for subsequent transportation to a place for further processing.

It should be noted that at all times the tree trunk is supported at two points which are spaced apart so that there is no danger of the entire length of the tree acting as a lever arm and with its weight exerting a heavy force on the saw mechanism. The mast for supporting the tree pulling and delimbing mechanism may be short, having to be only slightly longer than the sections into which the tree trunk is to be cut, or may be long if desired.

Because each of the delimbing jaws of the grapples is independently movable, the jaws position themselves to strip off the tree limbs and branches in an optimum fashion. Further, since each half of each jaw is separately attached to the mast, the jaws can withstand greater force during delimbing than has been the case heretofore. As a further feature of this invention, the grapple jaws are automatically brought closer together to bear on the trunk of the tree as the diameter of the trunk decreases while the tree is being fed through the delimbers.

The tree puller which has been described, being movable on somewhat flexible guides, can follow bent or irregularly shaped tree trunks. However, it is contemplated that tree pullers of various forms can be used within the teachings of this invention to achieve most if not all of the benefits and advantages.

My invention has been described with reference to specific structures, mechanisms and details, but it will be understood that various modifications and changes may be made within the scope of the appended claims.

I claim:
1. A tree harvester comprising:
a harvester vehicle;
an elongated power actuated boom articulated between its ends and having one end movably supported on said vehicle;
elongated mast means movably supported on the other end of said boom for positioning adjacent and in alignment with the trunk of a standing tree;
said mast including power operated tree holding means adjacent each end of said mast for engaging and holding the trunk of a tree;
power operated severing means supported on said mast for cutting off said tree below said holding means;
power operated means for moving said mast relative to said boom for swinging said tree to a generally horizontal position while said tree is held by said holding means;
said mast also including tree delimbing means;
and power operated tree moving means carried by said mast and positioned between said holding means for moving said tree endwise through said holding means and said delimbing means to delimb said tree.

2. A tree harvester in accordance with claim 1 in which said holding means includes a grapple means having a pair of jaw members adjacent each end of the mast for releasably grasping the trunk of said tree.

3. A tree harvester in accordance with claim 2 in which the delimbing means includes delimbing knives carried by at least one of said grapple means.

4. A tree harvester in accordance with claim 2 in which said delimbing means includes delimbing knives carried by the jaw members of each of said grapple means.

5. A tree harvester in accordance with claim 1 in which said tree moving means is positioned between said tree holding means and includes jaw means for releasably grasping the trunk of said tree and means for moving said jaw means longitudinally of said mast.

6. A tree harvester in accordance with claim 5 in which said tree moving means also includes a carriage mounted for movement longitudinally along said mast and carrying said jaw means;
and power operated means for moving said carriage along said mast.

7. A tree harvester in accordance with claim 6 in which the means for moving said carriage in one direction causes said jaw means to grasp the trunk of said tree and movement of said carriage in the opposite direction causes said jaw means to release the trunk of said tree.

8. A tree harvester in accordance with claim 6 in which said mast includes flexible guide means extending longitudinally of said mast and said carriage is supported on said flexible guide means.

9. A tree harvester in accordance with claim 1 in which said severing means comprises a chain saw mounted on one end of said mast and power means for moving said chain saw into sawing engagement with the trunk of a tree held by said tree holding means.

10. A tree harvester in accordance with claim 9 in which said chain saw is resiliently mounted on said mast for movement longitudinally of said mast.

11. A tree harvester in accordance with claim 1 in which said boom is mounted on said vehicle for pivotal movement relative to said vehicle about vertical and horizontal axes.

12. A tree harvester in accordance with claim 1 in which said mast is mounted on said other end of said boom for pivotal movement relative to said boom about two pivotal axes at right angles to each other.

References Cited

UNITED STATES PATENTS

| | | | |
|---|---|---|---|
| 3,252,487 | 5/1966 | Larson et al. | 144—2 XR |
| 3,140,736 | 7/1964 | Propst | 144—3 |
| 3,074,446 | 1/1963 | Earl | 144—3 |

FRANCIS S. HUSAR, Primary Examiner

U.S. Cl. X.R.
144—34